United States Patent
Kvasnica (10) Patent No.: US 9,990,119 B2
(45) Date of Patent: Jun. 5, 2018

(54) APPARATUS AND METHOD PERTAINING TO DISPLAY ORIENTATION

(75) Inventor: David Kvasnica, Dusseldorf (DE)

(73) Assignee: BlackBerry Limited, Waterloo, Ontario (CA)

(*) Notice: Subject to any disclaimer, the term of this patent is extended or adjusted under 35 U.S.C. 154(b) by 637 days.

(21) Appl. No.: 13/326,744

(22) Filed: Dec. 15, 2011

(65) Prior Publication Data

US 2013/0154950 A1    Jun. 20, 2013

(51) Int. Cl.
G06F 3/041 (2006.01)
G06F 3/0484 (2013.01)
G06F 3/0488 (2013.01)

(52) U.S. Cl.
CPC ...... *G06F 3/04845* (2013.01); *G06F 3/04883* (2013.01); *G06F 3/04886* (2013.01)

(58) Field of Classification Search
CPC ............. G06F 3/03547; G06F 3/04845; G06F 3/0488; G06F 3/04883; G06F 3/04886; G06F 2200/1614; G06F 2200/1637; G06F 2203/0339; G06F 2203/04808
USPC ................... 345/173–184, 156; 715/700–866
See application file for complete search history.

(56) References Cited

U.S. PATENT DOCUMENTS

| | | | |
|---|---|---|---|
| 2003/0142081 A1* | 7/2003 | Iizuka et al. | 345/173 |
| 2003/0184525 A1 | 10/2003 | Tsai | |
| 2004/0026136 A1 | 2/2004 | Hill et al. | |
| 2004/0196267 A1* | 10/2004 | Kawai et al. | 345/173 |
| 2004/0212617 A1* | 10/2004 | Fitzmaurice | G06F 3/0481 345/440 |
| 2005/0012723 A1* | 1/2005 | Pallakoff | 345/173 |
| 2005/0114788 A1 | 5/2005 | Fabritius | |
| 2005/0179653 A1 | 8/2005 | Hamon | |
| 2006/0197750 A1* | 9/2006 | Kerr et al. | 345/173 |
| 2006/0238517 A1* | 10/2006 | King et al. | 345/173 |
| 2008/0001924 A1 | 1/2008 | de los Reyes et al. | |
| 2008/0115091 A1 | 5/2008 | Jung et al. | |

(Continued)

FOREIGN PATENT DOCUMENTS

| | | |
|---|---|---|
| EP | 1061433 A2 | 12/2000 |
| EP | 2060971 A2 | 5/2009 |
| WO | WO 2010007813 A1 * | 1/2010 |

OTHER PUBLICATIONS

PCT Search Report and Written Opinion from related application No. PCT/EP2012/075669 dated Mar. 18, 2013; 12 pages.

(Continued)

*Primary Examiner* — Roberto Flores
(74) *Attorney, Agent, or Firm* — Thomas Grzesik; Fleit Gibbons Gutman Bongini & Bianco P.L.

(57) ABSTRACT

A control circuit detects a touch-based user interaction with a touch-responsive portion of a display and responsively alters a display modality of the display. This touch-responsive portion of the display may be visually non-specific as regards any corresponding touch-based functionality. This touch-responsive portion can comprise a touch-responsive periphery of the display. The touch-based user interaction can comprise a gesture that begins and/or concludes in the touch-responsive portion. The resultant alteration of the display modality can comprise rotating the display about a center point. This rotation can comprise, by one approach, switching from a landscape modality to a portrait modality or vice versa.

11 Claims, 4 Drawing Sheets

(56) References Cited

U.S. PATENT DOCUMENTS

| | | | |
|---|---|---|---|
| 2008/0158189 A1* | 7/2008 | Kim | 345/173 |
| 2008/0252611 A1* | 10/2008 | Min et al. | 345/173 |
| 2008/0284738 A1* | 11/2008 | Hovden et al. | 345/173 |
| 2009/0077488 A1* | 3/2009 | Ording | 715/784 |
| 2009/0085933 A1 | 4/2009 | Chen et al. | |
| 2009/0289958 A1 | 11/2009 | Kim et al. | |
| 2009/0295753 A1* | 12/2009 | King et al. | 345/174 |
| 2010/0013780 A1* | 1/2010 | Ikeda | G06F 3/04883 345/173 |
| 2010/0079395 A1* | 4/2010 | Kim et al. | 345/173 |
| 2010/0137027 A1* | 6/2010 | Kim | 455/556.1 |
| 2010/0162109 A1* | 6/2010 | Chatterjee et al. | 715/702 |
| 2010/0164959 A1* | 7/2010 | Brown et al. | 345/473 |
| 2010/0175018 A1* | 7/2010 | Petschnigg | G06F 3/0483 715/776 |
| 2010/0188353 A1* | 7/2010 | Yoon et al. | 345/173 |
| 2010/0214249 A1* | 8/2010 | Ikeda et al. | 345/173 |
| 2010/0245256 A1 | 9/2010 | Estrada et al. | |
| 2010/0287470 A1* | 11/2010 | Homma et al. | 715/702 |
| 2011/0012841 A1* | 1/2011 | Lin | 345/173 |
| 2011/0074716 A1* | 3/2011 | Ono | G06F 1/1626 345/173 |
| 2011/0109562 A1* | 5/2011 | Lin | 345/173 |
| 2011/0163967 A1* | 7/2011 | Chaudhri | G06F 3/0485 345/173 |
| 2011/0187660 A1 | 8/2011 | Hirata et al. | |
| 2011/0205163 A1* | 8/2011 | Hinckley et al. | 345/173 |
| 2011/0279385 A1* | 11/2011 | Chang | G06F 3/045 345/173 |
| 2011/0285645 A1* | 11/2011 | Cho et al. | 345/173 |
| 2011/0304584 A1* | 12/2011 | Hwang | G06F 3/04845 345/174 |
| 2012/0032905 A1* | 2/2012 | Koshiyama et al. | 345/173 |

OTHER PUBLICATIONS

Extended European Search Report for related European Patent Application No. 11193699.3; dated Aug. 7, 2012; 10 pages.

Article 94(3) EPC from related European Patent Application No. 11193699.3; dated Oct. 24, 2013; 6 pages.

* cited by examiner

APPARATUS AND METHOD PERTAINING TO DISPLAY ORIENTATION

FIELD OF TECHNOLOGY

The present disclosure relates to electronic devices, including but not limited to, portable electronic devices having touch-sensitive displays and their control.

BACKGROUND

Portable electronic devices such as tablet-based computers and so-called smart telephones are generally intended for handheld use and ease of portability. Many of these devices have a touch-sensitive display. A touch-sensitive display, also known as a touch-screen display, is particularly useful on handheld devices, which tend to be small and have limited space for user input and output.

In many cases the touch-screen display is substantially rectangular in shape, but not a square. Such displays are understood to have an aspect ratio of other than 1:1. Using such a display with its longer sides oriented horizontally is typically understood to represent a landscape orientation. On the other hand, using such a display with the shorter sides oriented horizontally is typically understood to represent a portrait orientation.

Some devices automatically select a particular modality in these regards as an executed function of the application being presented. Such a device may automatically present a word-processing application, for example, using a portrait modality. This same device may also automatically present a video-playback application using a landscape modality.

Some devices are capable of detecting, at least to some degree, their own physical orientation. For example, in some cases when a user is holding a tablet-based device and they physically rotate the device by 90 degrees, the device (using, for example, an accelerometer) detects that change in orientation and automatically makes a corresponding change to rotate displayed materials to match the new physical orientation of the device.

The foregoing approaches are useful to an extent. This is not to say, however, that existing approaches provide an adequate solution in each and every application setting.

DETAILED DESCRIPTION

The following describes an apparatus and method pertaining to selecting a particular display orientation. This can comprise, for example, detecting a touch-based user interaction with a touch-responsive portion of a display and responsively altering a display modality of the display. This touch-responsive portion of the display may be visually non-specific as regards any corresponding touch-based functionality. By one approach, for example, this touch-responsive portion can comprise a touch-responsive periphery of the display. As one illustrative example in these regards, this touch-responsive periphery can comprise, in effect, a frame for the display.

By one approach the aforementioned touch-based user interaction can comprise a gesture that begins and/or concludes in the touch-responsive portion. The resultant alteration of the display modality can comprise, for example, rotating the display about a center point. This rotation can comprise, by one approach, switching from a landscape modality to a portrait modality or vice versa.

So configured, a user can selectively rotate or otherwise shift a device's display without having to physically move the device itself and without having to select a particular application. At the same time, by one approach these teachings offer this benefit while avoiding problems that might otherwise arise due to ambiguity with respect to interpreting the user's touchscreen-based gestures. These teachings can be readily employed with existing touch screens and can serve to greatly leverage the value and functionality of such existing approaches. These teachings are also flexible in practice and highly scalable. Accordingly, these practices can be employed with a wide range of devices and in a wide variety of application settings.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, smart phones, wireless organizers, personal digital assistants, notebook computers, tablet computers, and so forth. The portable electronic device may include wireless communication capabilities as desired.

Figure 1:
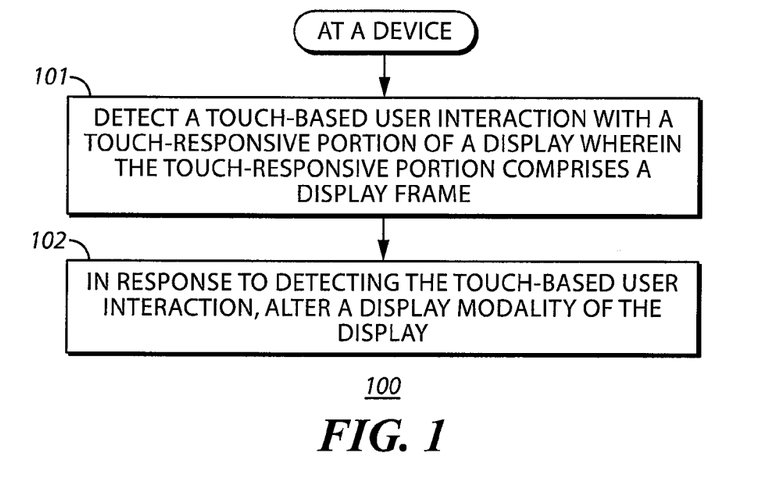
FIG. 1 is a flow diagram in accordance with the disclosure.
Figure 2:
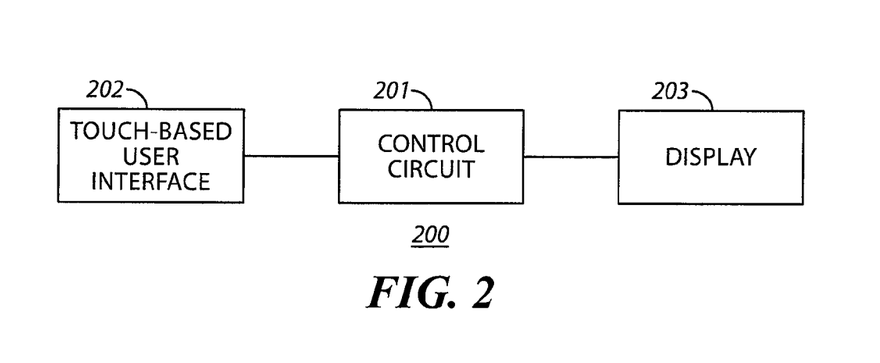
FIG. 2 is a block diagram in accordance with the disclosure.

FIG. 1 depicts a process 100 that can be carried out by the device of choice. Referring momentarily to FIG. 2, this device 200 can comprise a control circuit 201 that operably couples to a touch-based user interface and a display 203. This control circuit 201 can comprise a fixed-purpose (via, for example, hard-wiring) or a partially or wholly-programmable platform (such as a processor) as desired. This control circuit 201 is configured (for example, via corresponding programming) to carry out one or more of the actions or functions described herein as desired.

Figure 3:
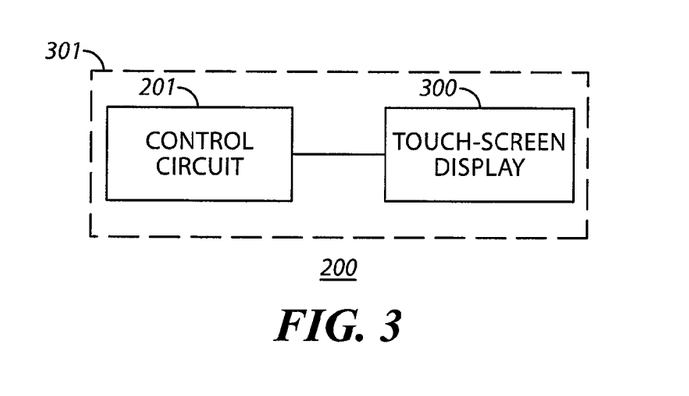
FIG. 3 is a block diagram in accordance with the disclosure.

The touch-based user interface 202 and the display 203 can comprise an integrated component as shown in FIG. 3 wherein a touch-screen display 300 serves in both regards. The touch-screen display 300 can utilize any touch-sensing technology and methodology, including but not limited to approaches that utilize capacitive, resistive, infrared, surface acoustic wave (SAW), strain gauge, optical imaging, dispersive signal technology, acoustic pulse recognition, and other approaches as are known in the art.

One or more touches, also known as touch contacts or touch events, may be detected by the touch-screen display 300. The control circuit 201 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-screen display 300. For example, the x location component may be determined by a signal generated from one touch sensor, and the y location component may be determined by a signal generated from another touch sensor. A touch may be detected from any suitable contact member, such as a finger, thumb, appendage, or other objects, for example, a stylus, pen, or other pointer, depending on the nature of the touch-screen display 300.

In many application settings the device 200 will further include a housing 301 that includes the foregoing components. For the sake of illustration and without intending any particular limitations in these regards, this description will presume this housing 301 to have a tablet-based form factor. Tablet-based computers are well known in the art and require no further elaboration here.

Figure 4:
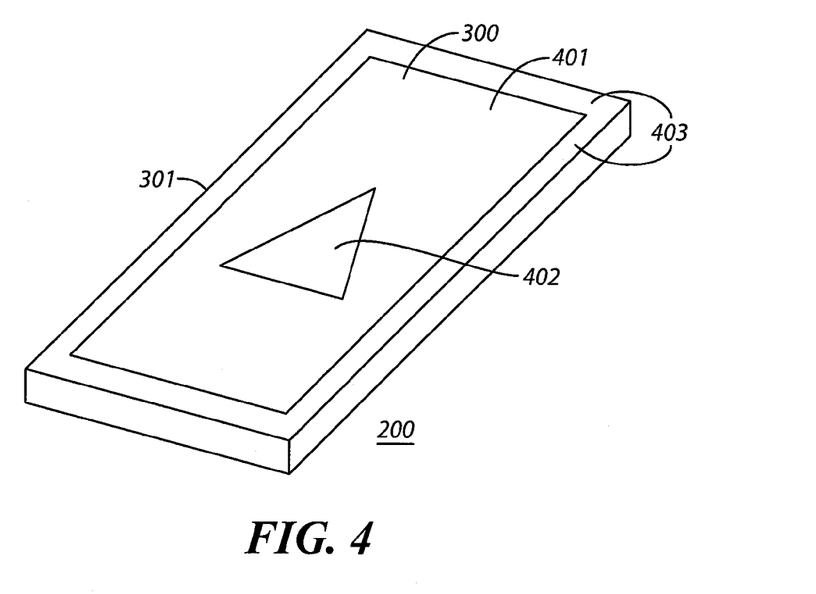
FIG. 4 is a perspective view in accordance with the disclosure.

Referring again to FIG. 1, this process 100 includes detecting 101 a touch-based user interaction with a touch-responsive portion of such a display 300. FIG. 4 offers an illustrative example in these regards. In this illustrative example the device 200 includes a touch-screen display 300 having a first touch-responsive portion 401 that serves to display application content 402 and that further serves to depict content that is visually specific as regards corresponding touch-based functionality (at least from time to time as appropriate to the running application). The latter can be as simple as the presentation of a user-selectable (via touching) button to the presentation of an image that the user can increase (or decrease) in size by a two-finger gesture made in conjunction with that image.

In this example the touch-screen display 300 also offers a second touch-responsive portion 403 that is visually non-specific as regards any corresponding touch-based functionality. By one approach (and as illustrated) this second touch-responsive portion 403 comprises a touch-responsive periphery of the display 300. So configured, this second touch-responsive portion 403 comprises a display frame that encompasses and frames the aforementioned first touch-responsive portion 401. This appearance can be enhanced, if desired, by presenting this touch-responsive periphery as having a substantially uniform width and a substantially uniform appearance such as a substantially uniform color (such as a dark color such as black, navy blue, myrtle green, maroon, and so forth). These teachings will accommodate other practices in these regards, including the use of a given pattern that employs two or more colors of choice.

So configured, the second touch-responsive portion 403 is, in fact, a part of the touch-screen display 300 but is presented in a way that tends to discourage its use during ordinary user interactions with the device 200 as there is no apparent or visually-intuitive associated functionality or purpose to touching this second touch-responsive portion 403. Such an approach can help to avoid, for example, responding inappropriately to touch-based interactions that occur simply due to the proximity of the display's periphery to the edge of the housing 301 where the user's fingers can make inadvertent contact with that periphery when simply holding the device 200.

By one approach, the detected touch-based user interaction comprises a user interaction that at least begins and/or concludes with the second touch-responsive portion 403. In any of these cases, if desired, the touch-based user interaction can also include user interaction with the first touch-responsive portion 401. By one approach, for example, a single continuous gesture in these regards can comprise a touch-based user interaction that begins and ends in the second touch-responsive portion 403 and that includes as well an excursion into the first touch-responsive portion 401.

Figure 5:
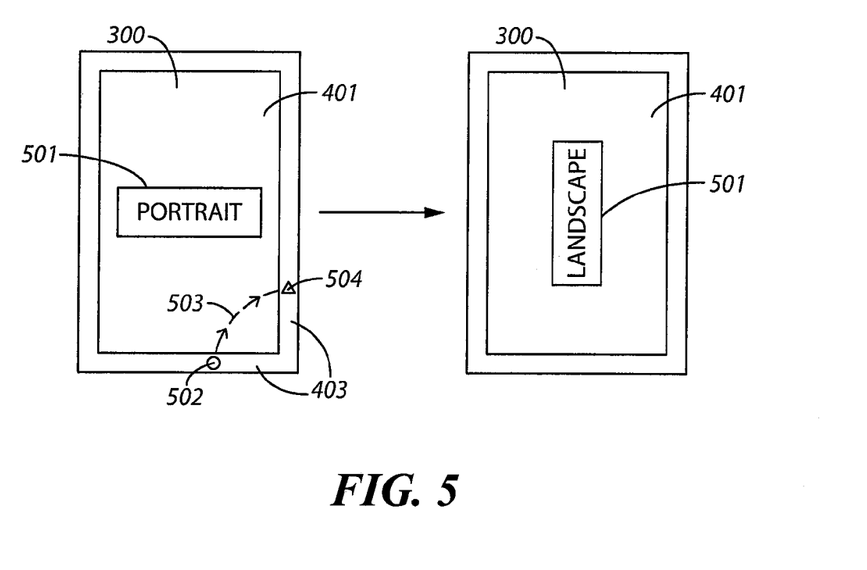
FIG. 5 is a top plan view in accordance with the disclosure.

FIG. 5 offers a first illustrative example of such an approach. In FIG. 5, the user's finger begins at the starting point denoted by reference numeral 502 (which is in the second touch-responsive portion 403 at the lowermost periphery of the display 300 (in this particular orientation)), passes through the first touch-responsive portion 401 as exemplified by the arrowed line that is denoted by reference numeral 503, and concludes at an ending point 504 in the second touch-responsive portion 403 where the user lifts their finger from the touch-screen display 300.

Referring again to FIG. 1, in response to detecting 101 the touch-based user interaction, the device 200 then alters 102 the display modality of the display 300. This can comprise, by one approach, altering the display orientation for the display 300. Referring again to FIG. 5, this can comprise, for example, switching from a portrait modality as regards the display of a given image 501 to a landscape display of that same image 501.

Figure 6:
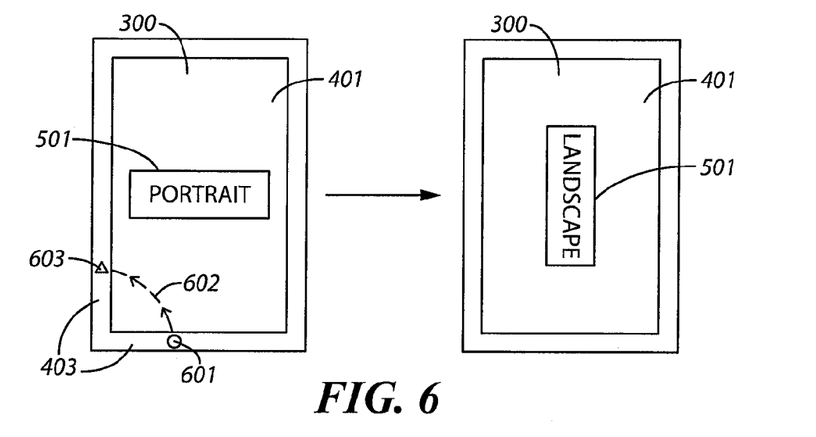
FIG. 6 is a top plan view in accordance with the disclosure.

In the illustrative example of FIG. 5, the user's touch-based gesture begins at the bottom of the portrait display and concludes on the right side of the display 300. As a result, the landscape-mode display of the image 501 is oriented with the display's bottom now corresponding to that right side of the display 300. FIG. 6 illustrates that the described process 100 can serve to orient the display 300 to a landscape modality that is reversed as compared to the result achieved in FIG. 5.

In FIG. 6, the user again begins the detected gesture by touching the second touch-responsive portion 403 in a lowermost portion thereof (see reference numeral 601) but this time moves their finger along the path denoted by reference numeral 602 to an end point 603 in the second touch-responsive portion 403 on the left side of the display 300. In this case, although the display 300 again switches from a portrait modality to a landscape modality, the landscape-mode image 501 is now oriented with the bottom of the image corresponding to the left side of the display 300.

So configured, the end user has the ability to not only switch the display from a portrait mode of display to a landscape mode of display, but to also select the polarity of that landscape mode of display. This flexibility permits the user to decide for themselves which of a plurality of landscape orientations to utilize in a given instance.

Figure 7:
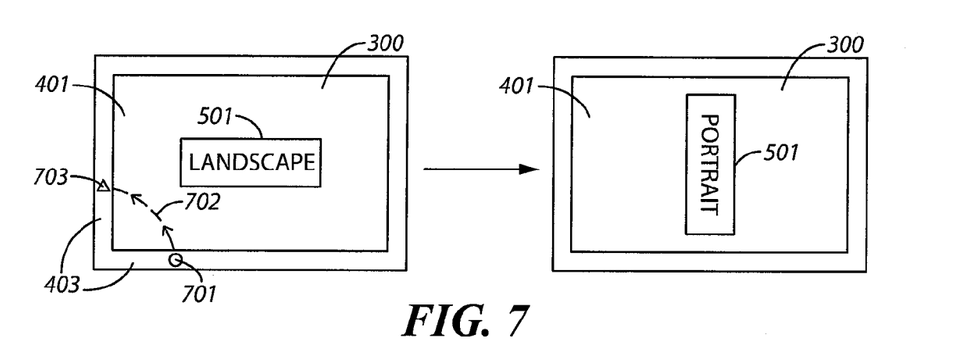
FIG. 7 is a top plan view in accordance with the disclosure.

This same process 100 can of course also serve to permit the user to switch from a landscape mode of display to a portrait mode of display. FIG. 7 provides an illustrative example in this regard. In this example, the user begins their gesture at a starting point 701 in the lowermost part of the second touch-responsive portion 403, passes 702 through the first touch-responsive portion 401, and concludes their gesture at an ending point 703 in the second touch-responsive portion 403 on the left side of the display 300. As a result, the display switches to a portrait mode of display where the bottom of the portrait mode corresponds to that left side of the display 300.

Figure 8:
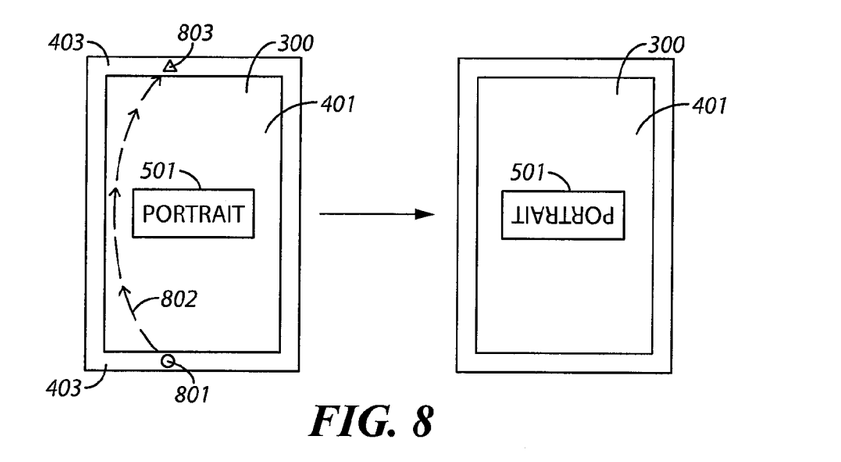
FIG. 8 is a top plan view in accordance with the disclosure.

In the illustrative examples provided above the display switches between portrait and landscape modes and vice versa. The flexibility of these teachings, however, will accommodate other results as well. FIG. 8 provides one illustrative example in these regards. In this example, the user begins their detected user interaction by touching the display 300 at a starting point 801 in the lower part of the second touch-responsive portion 403. The user then moves their finger through the first touch-responsive portion 401 along a path 802 that concludes at an end point 803 in the upper part of the second touch-responsive portion 403. As a result, the display inverts the portrait display of the image 501 (such that the bottom of the image 501 now corresponds with the top of the display 300 when viewed as shown).

Such an approach can permit, for example, a user to quickly flip the displayed image 501 without physically turning the device 200 in order to permit a person sitting opposite them to easily view the displayed image 501 when the device is resting on a table surface.

Figure 9:
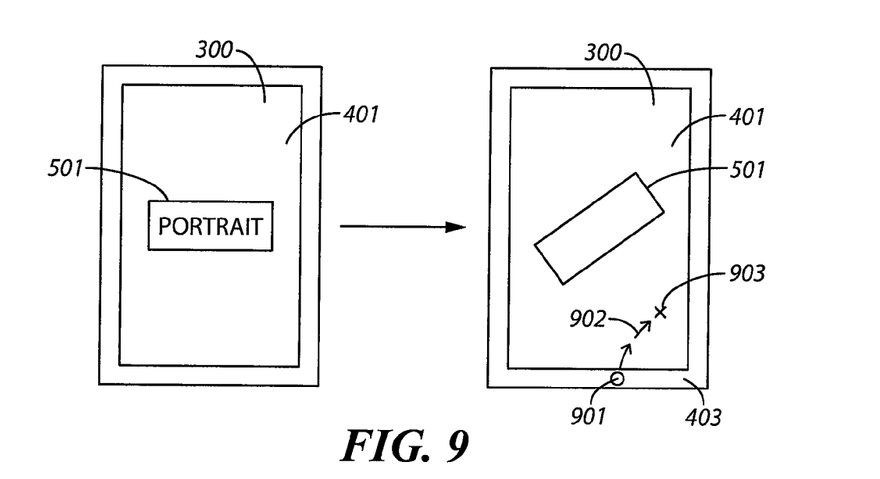
FIG. 9 is a top plan view in accordance with the disclosure.

As another example of the flexibility of these teachings, this process 100 can serve to rotate the display about, for example, a centerpoint. For example, as illustrated in FIG. 9, a user can begin the detected gesture at a starting point 901 in the lowermost section of the second touch-responsive portion 403. As the user then continues 902 the gesture, the displayed image 501 is rotated along with, and in the direction of the gesture. If the user then concludes the gesture at an end point 903 that is within the first touch-responsive portion 401, the displayed image 501 can be maintained at the corresponding rotational angle.

Figure 10:
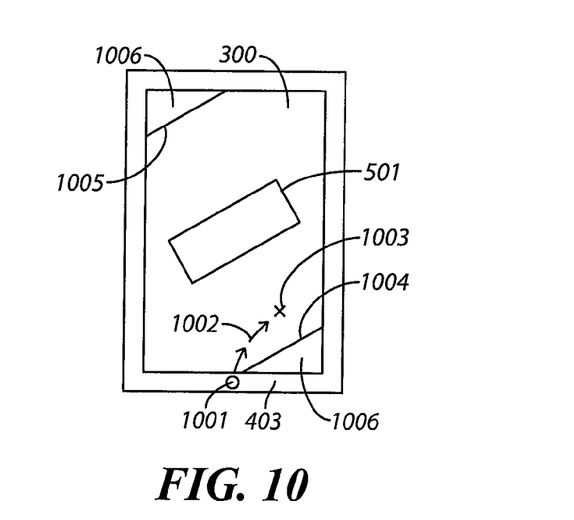
FIG. 10 is a top plan view in accordance with the disclosure.

If desired, and as shown in FIG. 10, the relevant frame edges of the displayed image 501 can be shown when rotating the display (the gesture being denoted by reference numerals 1001, 1002, and 1003) in the aforementioned manner. In this example, this includes the top and bottom frame edges 1004 and 1005. In such a case the portions 1006 that lie outside of the image frame can be visually distinguished using, for example, a solid color such as black.

The present disclosure describes particular example gestures and paths that a user moves his/her finger through to alter the orientation of a display. It is to be understood that the example gestures and paths are not to be construed as limiting the gestures and paths that are contemplated herein. For example, path 802 of FIG. 8 need not traverse the first touch-responsive portion 401 in a direct and slightly arcuate manner, and could instead be in a straight manner or a wobbling manner. It is to be understood that in some embodiments, it is the end points of the gesture and path that are used to determine appropriate display orientation alteration and that the intervening path of the gesture is irrelevant.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
    a touch-screen display having a first touch-responsive portion that serves to display application content and a second touch-responsive portion that has a substantially uniform appearance and that is visually non-specific as regards to any corresponding touch-based functionality; and
    a control circuit operably coupled to the touch-screen display and that is configured to
        detect a touch-based user interaction comprising a continuous touch beginning within a first region of the second touch-responsive portion and outside of the first-touch responsive portion, and continuing across the first touch-responsive portion;
        in response to detecting the touch-based user interaction, determine if the continuous touch has concluded within the first touch-responsive portion and outside of the second touch-responsive portion, or has concluded within a second region of the second touch-responsive portion and outside the first touch-responsive portion;
        in response to the continuous touch having concluded within the first touch-responsive portion and outside of the second touch-responsive portion, rotate displayed content about a center point;
        in response to the continuous touch having concluded within the second region of the second touch-responsive portion and outside the first touch-responsive portion, and further in response to the second region being adjacent to and adjoining the first region,
            determine that the continuous touch is associated with an attribute indicating that the continuous touch concluded within the second region of the second touch-responsive portion at one of a first side of the touch-screen display and a second side of the touch-screen display, wherein the attribute configures the control circuit to orientate a bottom portion of the displayed content to the one of the first side and the second side of the touch-screen display at which the continuous touch concluded, and
            change an orientation of the displayed content to a different orientation associated with the adjacent second region, where the orientation is changed independent of where the continuous touch contacted first touch-responsive portion, wherein the displayed content is presented at the different orientation with the bottom portion of the displayed content facing the one of the first side and the second side of the touch-screen display at which the continuous touch concluded; and
        in response to the continuous touch having concluded within the second region of the second touch-responsive portion and outside the first touch-responsive portion, and further in response to the second region being opposite from the first region, invert a polarity of the orientation of the displayed content.

2. The apparatus of claim 1 wherein the second touch-responsive portion comprises a touch-responsive periphery of the touch-screen display.

3. The apparatus of claim 1 wherein the substantially uniform appearance comprises a substantially uniform color.

4. The apparatus of claim 1 wherein the user interaction further includes user interaction with the first touch-responsive portion of the touch-screen display.

5. The apparatus of claim 1, wherein the second touch-responsive portion comprises at two adjacent regions to the first region, where each of the two adjacent regions is associated a different polarity of the same orientation.

6. The apparatus of claim 1, wherein rotating the displayed content about a center point comprises:

displaying frame edges of the displayed content as the displayed content is being rotated; and visually distinguishing regions outside of the frame edges from the displayed content and frame edges.

7. A method comprising:

at a device:

detecting a touch-based user interaction with a second touch-responsive portion of a touch-screen display, wherein the touch-based user interaction is a single contact-member touch-based user interaction, wherein the second touch-responsive portion comprises a display frame that surrounds a first touch-responsive portion of the touch-screen display that serves to display application content, and wherein the second touch-responsive portion is a part of the touch-screen display, and wherein the touch-based user interaction comprises a continuous touch beginning within a first region of the second touch-responsive portion and outside of the first touch-responsive portion, and continuing across the first touch-responsive portion;

in response to detecting the touch-based user interaction, determining if the continuous touch has concluded within the first touch-responsive portion and outside of the second touch-responsive portion, or has concluded within a second region of the second touch-responsive portion and outside the first touch-responsive portion;

in response to the continuous touch having concluded within the first touch-responsive portion and outside of the second touch-responsive portion, rotating displayed content about a center point;

in response to the continuous touch having concluded within the second region of the second touch-responsive portion and outside the first touch-responsive portion, and further in response to the second region being adjacent to and adjoining the first region, determining that the continuous touch is associated with an attribute indicating that the continuous touch concluded within the second region of the second touch-responsive portion at one of a first side of the touch-screen display and a second side of the touch-screen display, wherein the attribute configures the device to orientate a bottom portion of the displayed content to the one of the first side and the second side of the touch-screen display at which the continuous touch concluded, and changing an orientation of the displayed content to a different orientation associated with the adjacent second region, where the orientation is changed independent of where the continuous touch contacted first touch-responsive portion, wherein the displayed content is presented at the different orientation with the bottom portion of the displayed content facing the one of the first side and the second side of the touch-screen display at which the continuous touch concluded; and     in response to the continuous touch having concluded within the second region of the second touch-responsive portion and outside the first touch-responsive portion, and further in response to the second region being opposite from the first region, inverting a polarity of the orientation of the displayed content.

8. The method of claim 7 wherein changing an orientation of the displayed content to a different orientation associated with the adjacent second region comprises one of changing the orientation from a portrait orientation to a landscape orientation, and changing the orientation from a landscape orientation to a portrait orientation.

9. The method of claim 7, wherein the second touch-responsive portion comprises at two adjacent regions to the first region, where each of the two adjacent regions is associated a different polarity of the same orientation.

10. A portable hand-held apparatus comprising: a touch-screen display;

a control circuit configured to:

use a portion of the touch-screen display as a frame for a remaining central portion of the touch-screen display; and         detect a touch-based user interaction comprising a continuous touch beginning within a first region of the portion of the touch-screen display and outside the remaining central portion, and continuing across the remaining central portion;

in response to detecting the touch-based user interaction, determine if the continuous touch has concluded within a second region of the portion of the touch-screen display and outside of the remaining central portion, or has concluded within the remaining central portion and outside of the portion of the touch-screen display;

in response to the continuous touch having concluded within the remaining central portion and outside of the portion of the touch-screen display, rotate displayed content about a center point;

in response to the continuous touch having concluded within the second region of the portion of the touch-screen display and outside of the remaining central portion, and further in response to the second region being adjacent to and adjoining the first region,         determine that the continuous touch is associated with an attribute indicating that the continuous touch concluded within the second region of the second touch-responsive portion at one of a first side of the touch-screen display and a second side of the touch-screen display, where different sides of the touch-screen display are monitored for based on the apparatus being held in a portrait orientation or a landscape orientation, wherein the attribute configures the control circuit to orientate a bottom portion of the displayed content to the one of the first side and the second side of the touch-screen display at which the continuous touch concluded, and         change an orientation of the displayed content to a different orientation associated with the adjacent second region, where the orientation is changed independent of where the continuous touch contacted first touch-responsive portion, wherein the displayed content is presented at the different orientation with the bottom portion of the displayed content facing the one of the first side and the second side of the touch-screen display at which the continuous touch concluded; and         in response to the continuous touch having concluded within the second region of the portion of the touch-screen display and outside of the remaining central portion, and further in response to the second region being opposite from the first region, invert a polarity of the orientation of the displayed content.

11. The portable hand-held apparatus of claim 10 further comprising:

a housing that includes the touch-screen display and the control circuit, wherein the housing has a tablet-based form factor.

\* \* \* \* \*